(12) United States Patent
Reba et al.

(10) Patent No.: US 7,607,287 B2
(45) Date of Patent: Oct. 27, 2009

(54) AIRFOIL ACOUSTIC IMPEDANCE CONTROL

(75) Inventors: Ramons A. Reba, South Windsor, CT (US); Bruce L. Morin, Springfield, MA (US); Stephen A. Morford, Marlborough, CT (US); Wesley K. Lord, South Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 91 days.

(21) Appl. No.: 11/807,446

(22) Filed: May 29, 2007

(65) Prior Publication Data
US 2008/0295518 A1 Dec. 4, 2008

(51) Int. Cl.
*F02K 3/02* (2006.01)

(52) U.S. Cl. ............... 60/226.1; 415/119; 415/115; 416/232; 416/233

(58) Field of Classification Search ............... 60/226.1, 60/264, 725; 181/213; 415/115, 119, 208.1, 415/209; 116/232, 233, 500; 416/232, 233, 416/500
See application file for complete search history.

(56) References Cited

U.S. PATENT DOCUMENTS

| | | |
|---|---|---|
| 2,340,417 A | 2/1944 | Ellett |
| 2,751,168 A | 6/1956 | Stalker |
| 2,925,231 A | 2/1960 | Pfaff et al. |
| 3,316,714 A | 5/1967 | Smith et al. |
| 3,820,628 A | 6/1974 | Hanson |
| 3,972,383 A | 8/1976 | Green |
| 4,118,147 A * | 10/1978 | Ellis .................. 416/230 |
| 4,594,761 A | 6/1986 | Murphy et al. |
| 4,926,963 A | 5/1990 | Snyder |
| 5,018,203 A | 5/1991 | Sawyers et al. |
| 5,024,288 A | 6/1991 | Shepherd et al. |
| 5,119,427 A | 6/1992 | Hersh et al. |
| 5,169,288 A | 12/1992 | Gliebe et al. |
| 5,310,586 A | 5/1994 | Mullen |
| 5,375,972 A | 12/1994 | Gray |

(Continued)

FOREIGN PATENT DOCUMENTS

GB 2 026 622 A 2/1980

(Continued)

OTHER PUBLICATIONS

S. Horowitz, et al., "Compliant-Backplate Helmholtz Resonators for Active Noise Control Applications," from American Institute of Aeronautics and Astronautics 39th Aerospace Sciences Meeting & Exhibits, AIAA-2001-0817, pp. 1-9 (Jan. 2001).

(Continued)

*Primary Examiner*—Michael Cuff
*Assistant Examiner*—Phutthiwat Wongwian
(74) *Attorney, Agent, or Firm*—Kinney & Lange, P.A.

(57) ABSTRACT

A noise control cassette for a gas turbine engine includes a perforated face sheet configured for exposure to an airflow, a non-perforated backing sheet, a core arranged between the face sheet and the backing sheet and defining a cavity between the face sheet and the backing sheet having an effective length tuned so as to provide acoustic reactance control, and an attachment face for attaching the cassette to an airfoil-shaped structure.

18 Claims, 4 Drawing Sheets

U.S. PATENT DOCUMENTS

| | | | |
|---|---|---|---|
| 5,415,522 A | 5/1995 | Pla et al. | |
| 5,498,127 A | 3/1996 | Kraft et al. | |
| 5,498,137 A * | 3/1996 | El-Aini et al. | 416/229 A |
| 5,601,410 A | 2/1997 | Quinlan | |
| 5,613,649 A | 3/1997 | Schlinker et al. | |
| 5,626,462 A | 5/1997 | Jackson et al. | |
| 5,725,355 A * | 3/1998 | Crall et al. | 416/229 A |
| 5,810,552 A | 9/1998 | Frasier | |
| 6,004,095 A | 12/1999 | Waitz et al. | |
| 6,039,542 A | 3/2000 | Schilling et al. | |
| 6,139,259 A | 10/2000 | Ho et al. | |
| 6,439,840 B1 | 8/2002 | Tse | |
| 6,682,301 B2 | 1/2004 | Kuhne | |
| 7,018,172 B2 | 3/2006 | Prasad et al. | |
| 7,055,329 B2 | 6/2006 | Martens et al. | |
| 7,118,331 B2 | 10/2006 | Shahpar | |
| 7,322,195 B2 | 1/2008 | Borja et al. | |
| 2003/0082048 A1 * | 5/2003 | Jackson et al. | 415/115 |
| 2005/0135924 A1 * | 6/2005 | Prasad et al. | 415/115 |
| 2005/0254955 A1 * | 11/2005 | Helder et al. | 416/233 |
| 2006/0104819 A1 * | 5/2006 | Jones et al. | 416/233 |
| 2007/0251760 A1 | 11/2007 | Baarck et al. | |
| 2007/0272483 A1 | 11/2007 | Morin et al. | |
| 2008/0159856 A1 * | 7/2008 | Moniz et al. | 415/198.1 |

FOREIGN PATENT DOCUMENTS

GB 2361035 A 10/2001

OTHER PUBLICATIONS

S.B. Horowitz, et al., "Characterization of a Compliant-Backplate Helmholtz Resonator for an Electromechanical Acoustic Liner," from *International Journal of Aeroacoustics* vol. 1, No. 2, pp. 183-205 (2002).

M.A. Galland, et al., "Performance in wind tunnel of hybrid active/passive absorbent panels," from *American Institute of Aeronautics and Astronautics*, AIAA-2005-2895 pp. 1-13, (2005).

S. Kadirvel, et al., "A Self-Powered Wireless Active Acoustic Liner," from *American Institute of Aeronautics and Astronautics*, AIAA-2006-2400, pp. 110 (2006).

* cited by examiner

AIRFOIL ACOUSTIC IMPEDANCE CONTROL

BACKGROUND

The present invention relates to noise control for gas turbine engines, and more particularly to fan exit guide vanes having acoustic impedance control features for attenuating or dampening noise in a gas turbine engine.

Gas turbine engines often include a bypass duct, especially engines used for commercial aerospace applications. A fan assembly can draw air into the engine, and a portion of that air is diverted through the bypass duct. Fan exit guide vanes (FEGVs) extend into the bypass duct downstream of the fan assembly. These FEGVs provide an aerodynamic function in straightening or otherwise interacting with airflow from the fan assembly, and a structural function in delivering mechanical support in a generally radial direction across the bypass duct.

However, noise produced by gas turbine engines is a concern. Noise generated by fan-wake/vane interaction is a significant contributor to the effective perceived noise level (EPNL) of gas turbine engines. Such noise problems can occur when wakes of the upstream fan assembly impinge on the FEGVs, thereby providing a mechanism for converting non-acoustic vortical disturbances (i.e., the fan wake) into propagating pressure disturbances (i.e., sound).

A number of prior art solutions have been proposed to address these concerns. For instance, active noise control using vane-mounted actuators, and use of vane sweep and lean to introduce radial phase cancellation are known, but such systems are often undesirably complex. Also, acoustic bypass duct liners are known for dampening noise along the fan bypass duct, but such liners can be undesirably large. In addition, engine systems can be designed to mitigate fan-wake/vane interaction by doing the following: (a) increasing axial spacing between the fan assembly and the FEGVs to increase decay of a wake velocity deficit, (b) selecting a sufficiently high ratio of FEGVs to fan assembly blades such that, for the associated blade-passing frequency, spinning modes generated by the fan-wake/vane interacting are "cut-off" and cannot transmit acoustic power all the way through the length of the bypass duct, and (c) utilizing a relatively long bypass duct. These solutions undesirably constrain fan assembly, fan case and FEGV structural design, and can dictate a longer bypass duct that would otherwise be desired.

SUMMARY

A noise control cassette for a gas turbine engine includes a perforated face sheet configured for exposure to an airflow, a non-perforated backing sheet, a core arranged between the face sheet and the backing sheet and defining a cavity between the face sheet and the backing sheet having an effective length tuned so as to provide acoustic reactance control, and an attachment face for attaching the cassette to an airfoil-shaped structure.

DETAILED DESCRIPTION

In general, the present invention provides airfoil acoustic impedance control to help attenuate (or dampen) noise within a gas turbine engine. More particularly, the present invention relates to features of a fan exit guide vane (FEGV) that dampen pressure (i.e., sound) disturbances by tuning FEGV surface acoustic impedance to modify unsteady aerodynamic response such that noise produced by fan wakes interacting with the FEGV is reduced. The present invention provides noise dampening in a relatively simple and lightweight manner, and, in some embodiments, in an entirely passive manner. Moreover, the use of an acoustic impedance control cassette attached to a FEGV according to the present invention is advantageous for fabrication and assembly.

Figure 1:
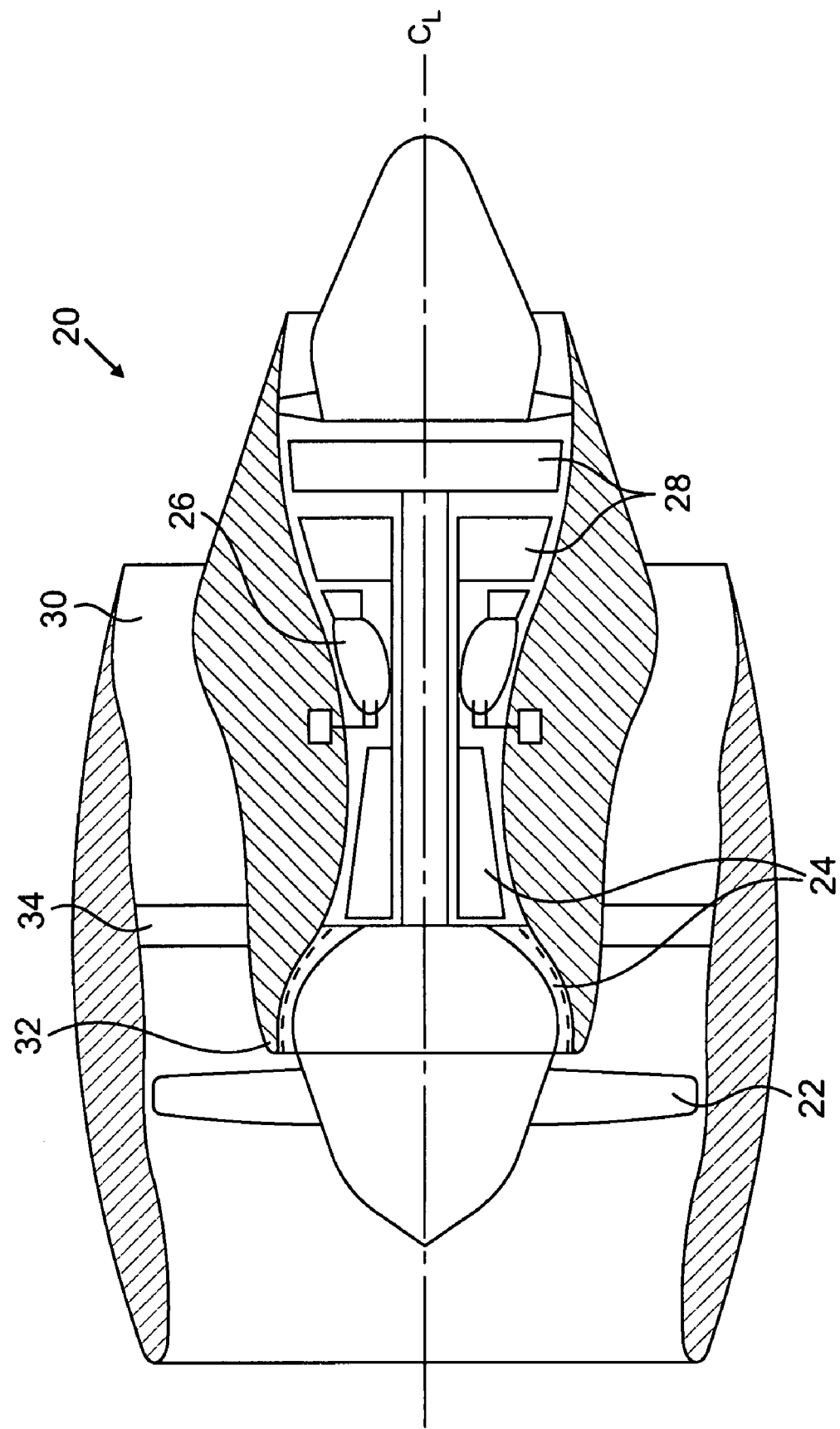
FIG. 1 is a schematic cross-sectional view of a gas turbine engine.

FIG. 1 is a schematic cross-sectional view of an exemplary gas turbine engine 20 that includes a fan 22, one or more compressor sections 24, a combustor 26, one or more turbine sections 28, and a bypass duct 30. The fan 22 rotates relative to an engine centerline $C_L$, and draws ambient air into the engine 20. In the illustrated embodiment, the engine 20 is a high bypass ratio engine suitable for commercial aerospace applications, although the present invention applies to other types of gas turbine engines as well. A portion of the air that passes the fan 22 is diverted by a flow diverter 32 into the bypass duct 30. A plurality of generally radially-oriented fan exit guide vanes (FEGVs) 34 extend across the bypass duct 30 downstream of the fan 22. The FEGVs 34 provide, among other things, an aerodynamic function in straightening or otherwise interacting with airflow from the fan 22, and a structural (or mechanical support) function across the bypass duct 30.

During operation of the engine 20, the fan 22 may produce a wake, which can comprise non-acoustic vortical disturbances, that can impinge upon the FEGVs 34. Noise, typically in the range of about 2-3 kHz, can be generated by interaction between the fan wake and the FEGVs 34, which provides a mechanism for converting the fan wake into propagating pressure disturbances (i.e., sound). Such fan-wake/FEGV interaction can be a significant contributor to the effective perceived noise level (EPNL) of the engine 20. The present invention helps to attenuate or dampen such noise, thereby helping to reduce the EPNL of the engine 20.

Figure 2:
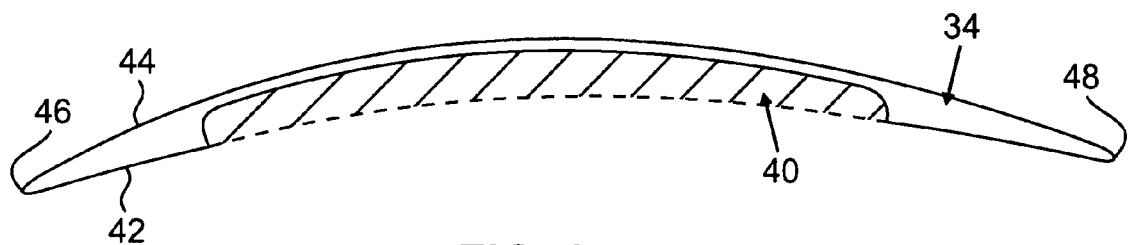
FIG. 2 is a schematic view of a fan exit guide vane having a cassette insert according to the present invention.

FIG. 2 is a schematic view of a FEGV 34 having a cassette insert 40 attached thereto. As shown in FIG. 2, the FEGV 34 has an airfoil shape that defines a concave pressure side 42 and an opposite convex suction side 44, as well as a leading edge 46 and an opposite trailing edge 48. The cassette insert 40 is attached to the FEGV 34 at the pressure side 42, at a location intermediate between the leading and trailing edges 46 and 48, respectively. In alternative embodiments, the cassette insert 40 can be attached to the FEGV 34 at other locations.

Figure 3:
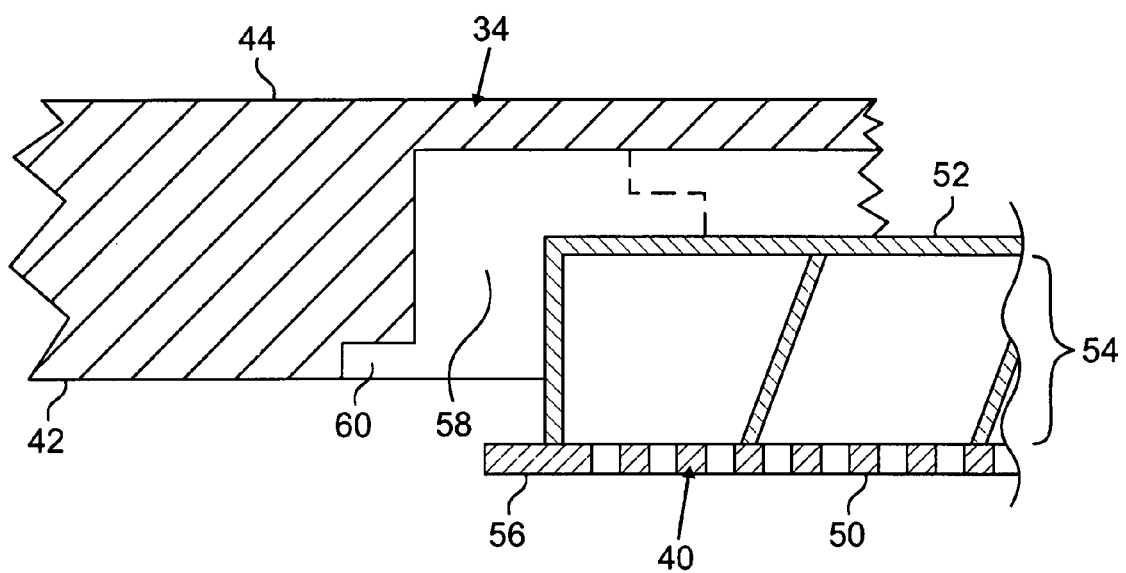
FIG. 3 is an exploded cross-sectional view of portions of a fan exit guide vane and a cassette insert.

FIG. 3 is an exploded cross-sectional view of portions of the FEGV 34 and the cassette insert 40. The view in FIG. 3 is highly schematic and does not show the actual curvature of the FEGV 34. The cassette insert 40 includes a face sheet 50, a backing sheet 52, a core 54 located between the face sheet 50 and the backing sheet 52, and an attachment flange 56. The components of the cassette insert 40 can be made from materials well-known for aerospace applications. In the illustrated embodiment, the face sheet 50 is perforated, the backing sheet 52 is non-perforated, and the core 54 comprises a honeycomb structure (i.e., a structure forming a plurality of discrete cells of any desired shape and size). The FEGV 34 includes a cassette-shaped pocket 58 having an attachment region 60. The FEGV 34 is typically a solid vane, that is, it does not have internal cavities or passages such as film cooling holes. However, in alternative embodiments, internal cavities can be present in the FEGV 34. The FEGV 34 can be formed in a conventional manner, and the pocket 58 can be formed by removing material of the FEGV 34 using known machining processes.

When assembled together, the cassette insert 40 is at least partially inserted into the pocket 58 of the FEGV 34. The backing sheet 52 can be positioned toward the suction side 44 of the FEGV 34, and the face sheet 50 can be positioned substantially flush with the pressure side 42 of the FEGV 34. The attachment flange 56 of the cassette insert 40 can be positioned in the attachment region 60 of the pocket 58, and secured using screws, adhesive, or other suitable fastening means. The present invention thus allows the FEGV 34 and the cassette insert 40 to be fabricated separately, and later assembled in a relatively simple manner. This provides numerous advantages for fabrication and assembly. Moreover, it is possible to retrofit the cassette insert 40 onto existing FEGVs 34 that have had a pocket 58 machined out.

Figure 4:
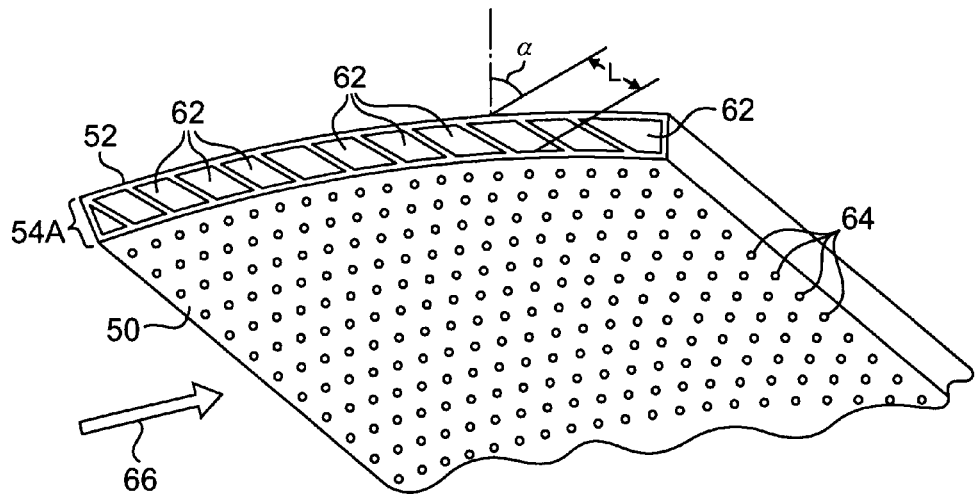
FIG. 4 is a perspective view of a portion of one embodiment of a cassette insert.

FIG. 4 is a perspective view of a portion of one embodiment of the cassette insert 40, which has a core 54A that includes a honeycomb structure formed from a plurality of discrete cells (or cavities) 62 each arranged at an incline angle $\alpha$ with respect to the face sheet 50. In the illustrated embodiment, the incline angle $\alpha$ is 60°. The face sheet 50 is perforated with a plurality of openings 64 (only a portion of the openings 64 are labeled in FIG. 4 for simplicity) that allow fluid communication between the cells 62 of the core 54A and airflow 66 adjacent to the cassette insert 40. The backing sheet 52 is non-perforated, meaning that fluid cannot pass through the backing sheet 52, and therefore cannot pass through cassette insert 40 and the FEGV 34. In this way, the cells 62 exposed to airflow form Helmholtz resonators for providing noise attenuation. Each of the openings 64 can have a diameter of up to about 0.127 millimeters (0.005 inches). In one embodiment, each of the openings 64 has a diameter of approximately 0.0254 millimeters (0.001 inches), and a total open-area of the face sheet 50 provided by the openings 64 is approximately 10 to 20% of a total surface area of the face sheet 50. However, the particular size, size variation, and arrangement of the openings 64, as well as the open-area ratio of the face sheet 50, can vary as desired for particular applications. For instance, the openings 64 in the face sheet 50 can be configured as disclosed in commonly-assigned U.S. Pat. App. Pub. No. 2007/0272483.

The acoustic properties of the cassette insert 40 can be characterized by the complex-valued specific acoustic impedance Z according to the following equation, where the real part R is the acoustic resistance and the imaginary part X is the reactance:

$$Z=R+iX$$

Optimum reactance (for maximizing sound attenuation) typically falls within the range $-1<X<0$, where the particular value depends on geometry of the fan 22 and FEGVs 34, air flow speed, and sound frequency.

With respect to the cassette insert 40, its reactance is determined by an effective length L of the cells 62 of the core 54A (i.e., a backing cavity depth). Properties of the face sheet 50 generally have minimal effect on reactance. For the optimum reactance range given above, the effective length L of the cells 62 of the core 54A should range from $\lambda/8$ to $\lambda/4$, where $\lambda$ is the wavelength of sound. Thus, at a sound frequency of 2500 Hz, the optimum effective length L ranges from approximately 1.702 centimeters (0.67 inches) to approximately 3.404 centimeters (1.34 inches).

Depending on size of the engine 20 and number of FEGVs 34, a chord length of each FEGV 34 (measured between the leading edge 46 and the trailing edge 48) is typically approximately 15.24 to approximately 25.4 centimeters (6 to 10 inches). The FEGVs 34 can utilize a variety of thickness distributions, though aerodynamic performance constraints often dictate an airfoil maximum thickness (i.e., thickness between the pressure side 42 and the suction side 44) of about 7% of chord. Thus, the thickness of the FEGV 34 is typically at most approximately 1.778 centimeters (0.7 inches), and could be as small as approximately 1.016 (0.4 inches). In addition to their aerodynamic role, the FEGVs 34 have a structural function, generally requiring a wall thickness no less than 0.508 centimeters (0.2 inches) (i.e., a wall thickness at the pocket 58 in the FEGV 34). As a result, a depth available for the cassette insert 40 ranges from approximately 0.508 centimeters to approximately 1.27 centimeters (0.2 to 0.5 inches), compared to a desired effective length L of the cells 62 of the cassette insert 40 of approximately 1.702 centimeters to approximately 3.404 centimeters (0.67 to 1.34 inches) to obtain optimum acoustic benefit in attenuating noise.

In order to provide a desired effective length L with relatively thin FEGVs 34, the cells 62 of the core 54A of the cassette insert 40 are positioned at an incline angle $\alpha$ with respect to the face sheet 50. In the embodiment illustrated in FIG. 4, the cells 62 are inclined in a chordwise direction, although in alternative embodiments other arrangements are possible (e.g., the cells 62 can be inclined in a spanwise direction or in both chordwise and spanwise directions). The inclination of the cells 62 allows for tuning and optimization of the acoustic reactance of the cassette insert 40. For the embodiment shown in FIG. 4, an incline angle $\alpha$ of 60° would allow an effective length L equal to twice the thickness of the FEGV 34 (i.e., the vane-normal depth with respect to the face sheet 50).

Figure 5:
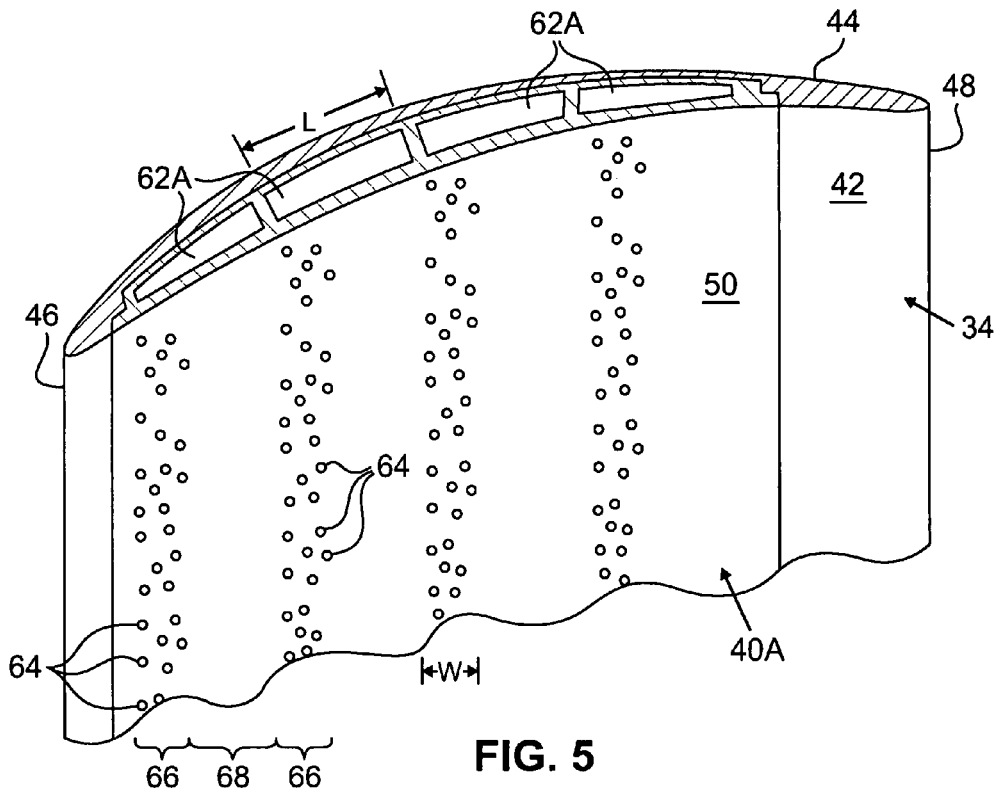
FIG. 5 is a perspective view of a portion of a fan exit guide vane with another embodiment of a cassette insert.

A variety of alternative embodiments of the cassette insert 40 are possible according to the present invention. FIG. 5 is a perspective view of a portion of the FEGV 34 with another embodiment of a cassette insert 40A having openings 64 in the face sheet 50 grouped in rows 66 with non-perforated (solid) regions of the face sheet 50 located between the rows 66 of the openings 64. In the illustrated embodiment, the rows 66 extend in a generally spanwise direction, although in alternative embodiments other arrangements are possible (e.g., extending in a generally chordwise direction). Each row 66 of the openings 64 in the face sheet 50 is arranged at a forward side of cells 62A of the cassette insert 40A. Each row 66 can have a width W, which in one embodiment can be 0.635 centimeters (¼ inch). The cells 62A are generally cuboid-shaped (i.e., generally rectangular boxes). The cells 62A of the cassette insert 40A are arranged at an inclination angle $\alpha$ of approximately 90°, such that an effective length L of the cells 62A is substantially parallel to the face sheet 50. In one embodiment, each cell 62A has dimensions of approximately 0.635×0.635×2.54 centimeters (¼×¼×1 inch), where the effective length L is the approximately 2.54 centimeter (1 inch) dimension. Although not fully visible in FIG. 5, the cells 62A can be arranged in spanwise rows aligned with the rows 66 of openings 64.

Figure 6:
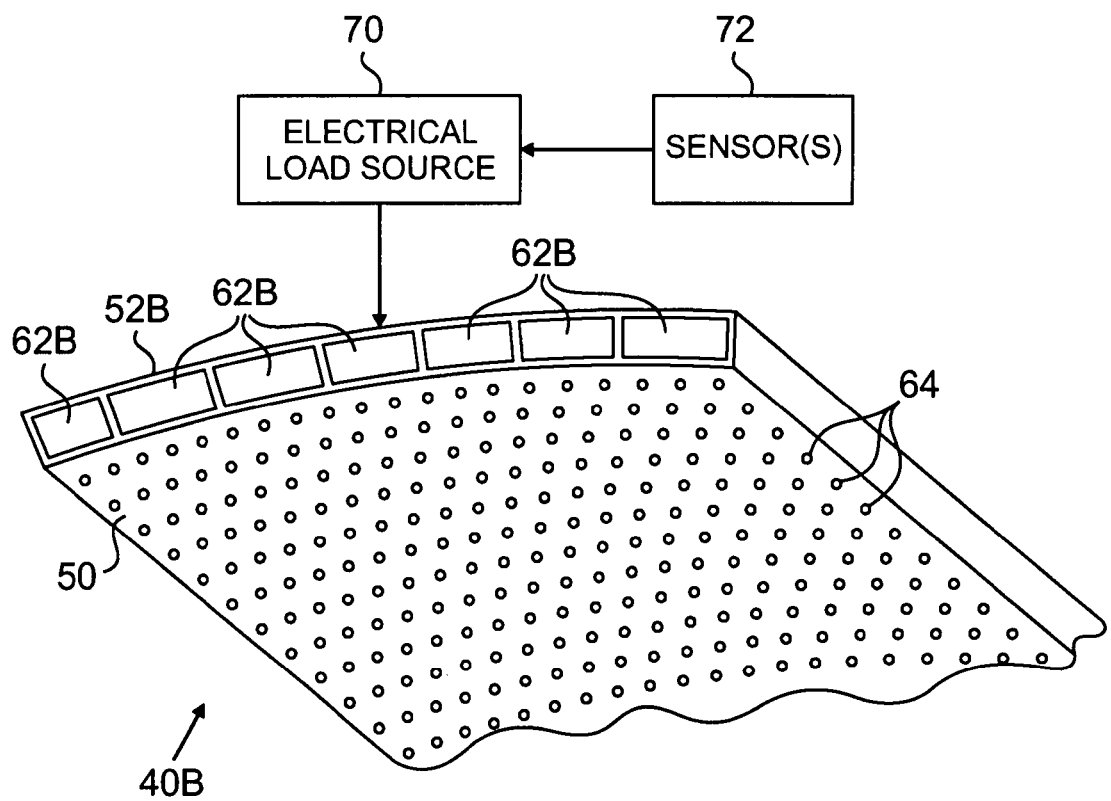
FIG. 6 is a perspective view of a portion of another embodiment of a cassette insert having an active control system shown schematically.

FIG. 6 is a perspective view of a portion of another embodiment of a cassette insert 40B that includes a perforated face sheet 50 and a backing sheet 52B formed from a compliant, non-perforated piezoelectric (PZT) panel. The PZT backing sheet 52B is operably connected to an electrical load source 70, which allows the reactance of the cassette insert 40B to be controlled in a hybrid passive and active manner. By adjusting the electrical load supplied to the PZT backing sheet 52B by the load source 70, the PZT backing sheet 52B can deform to adjust the effective lengths L of the cells 62B to provide a desired resonance frequency. Furthermore, in some embodiments, one or more sensors 72 operably connected to the electrical load source 70 can be positioned at a cell 62B, an FEGV 34 or a wall of the bypass duct 30 to sense sound level or frequency. In this way, adaptive tuning, with or without feedback control, can be provided to adjust the electrical load supplied to the PZT backing sheet 52B.

It will thus be recognized that the present invention provides numerous benefits, such as mitigating the adverse acoustical effects of reduced fan-to-FEGV spacing and low vane-count "cut-on" engine designs. Therefore, the present invention offers potential weight and cost reduction over prior art systems. In addition, by enabling a close-coupled fan and FEGV, the use of a FEGV cassette insert according to the present invention can help reduce maintenance costs by providing easier access to compressor compartments, especially a low-pressure compressor compartment.

It should also be noted that the present invention can apply to both low vane-count "cut-on" designs as well as more conventional high vane-count "cut-off" designs. Although for a constant solidity a high vane-count "cut-off" design affords less space to accommodate a cassette insert according to the present invention, such configurations generally target the second harmonic of the blade passing frequency, and therefore an optimum effective length of resonator cells of the cassette insert are smaller that with "cut-on" designs (by approximately a factor of two).

Although the present invention has been described with reference to preferred embodiments, workers skilled in the art will recognize that changes may be made in form and detail without departing from the spirit and scope of the invention. For instance, an acoustic impedance control cassette insert according to the present invention can be attached to gas turbine engine components other than FEGVs.

What is claimed is:

1. A noise control cassette assembly for a gas turbine engine, the cassette assembly comprising: a fan exit guide vane located downstream from a fan assembly and having a pocket defined at a pressure side of an airfoil portion of the fan exit guide vane; and a cassette comprising: a perforated face sheet configured for exposure to an airflow; a non-perforated backing sheet; a core arranged between the perforated face sheet and the non-perforated backing sheet and defining a cavity between the perforated face sheet and the non-perforated backing sheet having an effective length tuned so as to provide acoustic reactance control; and an attachment face attaching the cassette to the pocket of the fan exit guide vane.

2. The cassette assembly of claim 1, wherein the core comprises a honeycomb core that defines a plurality of Helmholtz resonator cavities therein.

3. The cassette assembly of claim 2, wherein the plurality of Helmholtz resonator cavities of the honeycomb core are angled at an orientation other than perpendicular with respect to the perforated face sheet.

4. The cassette assembly of claim 1, wherein a plurality of openings in fluid communication with the core define perforations in the perforated face sheet such that an open-area of the perforated face sheet is approximately 10 to 20% of a total surface area of the perforated face sheet.

5. The cassette assembly of claim 1, wherein each of the openings has a diameter of approximately 0-0.127 millimeters (0-0.005 inches).

6. The cassette assembly of claim 1, wherein a plurality of openings in fluid communication with the core are arranged in rows that define perforated regions in the perforated face sheet separated by at least one non-perforated region of the perforated face sheet.

7. The cassette assembly of claim 6, wherein the core comprises a plurality of rectangular Helmholtz resonator cells each having an effective length arranged substantially parallel to the perforated face sheet.

8. The cassette assembly of claim 1, wherein the effective length is between approximately 1.702 centimeters (0.67 inches) and approximately 3.404 centimeters (1.34 inches).

9. The cassette assembly of claim 1 wherein the backing sheet comprises a compliant piezoelectric panel, such that the effective length of the cavity is adjustable as a function of an electric load applied to the piezoelectric panel to dynamically tune the acoustic impedance.

10. The cassette assembly of claim 9 and further comprising:
a sensor operably connected to the piezoelectric panel.

11. A gas turbine engine apparatus comprising:
a fan assembly;
a fan exit guide vane located downstream from the fan assembly and having a pocket defined at a pressure side of an airfoil portion of the fan exit guide vane; and
a cassette secured to the fan exit guide vane, the cassette comprising:
a face sheet located adjacent to the pocket and having a plurality of openings defined therethrough;
a non-perforated backing sheet positioned at least partially within the pocket; and
a core arranged between the face sheet and the non-perforated backing sheet and defining a plurality of cavities each in fluid communication with at least one of the plurality of openings in the face sheet, wherein each cavity has a effective length tuned for providing noise dampening.

12. The apparatus of claim 11, wherein the core comprises a honeycomb core, and wherein the plurality of cavities of the honeycomb core are angled at an orientation other than perpendicular with respect to the face sheet.

13. The apparatus of claim 11, wherein the plurality of openings in the face sheet provide an open-area that is approximately 10 to 20% of a total surface area of the face sheet.

14. The apparatus of claim 11, wherein a plurality of openings in the face sheet are arranged in rows that define perforated regions of the face sheet separated by at least one non-perforated region of the face sheet.

15. The apparatus of claim 14, wherein the cavities of the core comprise a plurality of rectangular cells each having an effective length arranged substantially parallel to the face sheet.

16. The apparatus of claim 11 wherein the backing sheet comprises a compliant piezoelectric panel, such that the effective length of at least one of the plurality of cavities is adjustably tuned as a function of an electric load applied to the piezoelectric panel.

17. The apparatus of claim 16 and further comprising:
a sensor operably connected to the piezoelectric panel.

18. The apparatus of claim 11, wherein the effective tuned length is between approximately 1.702 centimeters (0.67 inches) and approximately 3.404 centimeters (1.34 inches).

* * * * *